Figure 1:
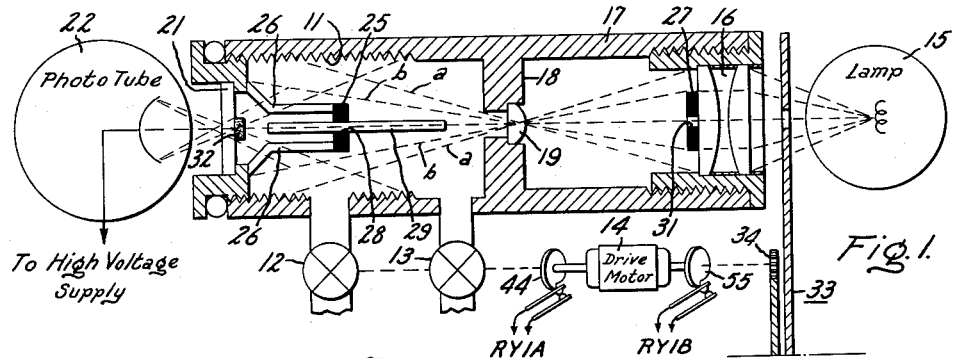

Aug. 31, 1965 G. F. SKALA ETAL 3,203,309
SINGLE PHOTOTUBE STABILIZED CONDENSATION NUCLEI METER
Filed Sept. 13, 1962

Inventors:
George F. Skala,
Theodore A. Rich,
by Charles W. Helzer
Their Attorney.

United States Patent Office 3,203,309
Patented Aug. 31, 1965

3,203,309
SINGLE PHOTOTUBE STABILIZED CONDENSATION NUCLEI METER
George F. Skala and Theodore A. Rich, Scotia, N.Y., assignors to General Electric Company, a corporation of New York
Filed Sept. 13, 1962, Ser. No. 223,486
9 Claims. (Cl. 88—14)

This invention relates to a new and improved condensation nuclei meter.

More specifically, the invention relates to a stabilized condensation nuclei meter employing only a single phototube.

A condensation nuclei meter is a device for measuring small condensation nuclei (sometimes referred to as aerosol particles) which are sub-microscopic particles varying from about 0.001 to 0.1 micron in diameter, and that are either solid or liquid in nature, and serve as condensation centers. The presence of condensation nuclei in the atmosphere is an important factor affecting such phenomena as fog, clouds, mist and rain, and air pollution. While there are a number of satisfactory condensation nuclei meters available, they are for the most part designed to answer specific measurement problems, and possess characteristics such as low sampling rates, relatively high cost, etc., which render them impractical for use in a number of situations. One of the more significant problems encountered in the design of a fast sampling, automatic condensation nuclei meter is the problem of stabilization of the meter reading against changes in the phototube characteristics, as well as compensating for changes in the optical properties of the expansion chamber and varying light output of the illuminator comprising a part of the meter. Some of these problems have been solved in the past through the use of an additional phototube, or through the use of coupling circuits and/or expensive regulating circuits used in conjunction with the power supplies of the equipment. None of these methods of stabilization have the effect of compensating for changes in phototube characteristics or optical properties.

It is, therefore, a primary object of the present invention to provide a new and improved single phototube stabilized condensation nuclei meter which is capable of providing a highly accurate measurement of the number of condensation nuclei.

In practicing the invention, a new and improved condensation nuclei meter is provided which includes condensing means for periodically condensing water droplets about the nuclei particles as condensation centers. A light source is positioned for directing light through the condensing means, and light sensitive means are positioned to be responsive to light scattered by the water droplets formed in the condensing means for developing an output electric signal representative of the condensation nuclei count. Additional means are provided for transmitting a reference light beam from the light source through the condensing means directly to the light sensitive means, and light modifying means are positioned intermediate the light source and the condensing means for modifying the light from the light source to cause it selectively to travel to the light sensitive means by either the light scattering path or directly. Additionally, comparison circuit means are provided which are operatively coupled to the light sensitive means for comparing the output electric signal developed by the light sentitive means in response to the direct path light rays to a reference potential to develop an output error signal for use in maintaining the sensitivity of the meter at a preselected level.

Figure 2:
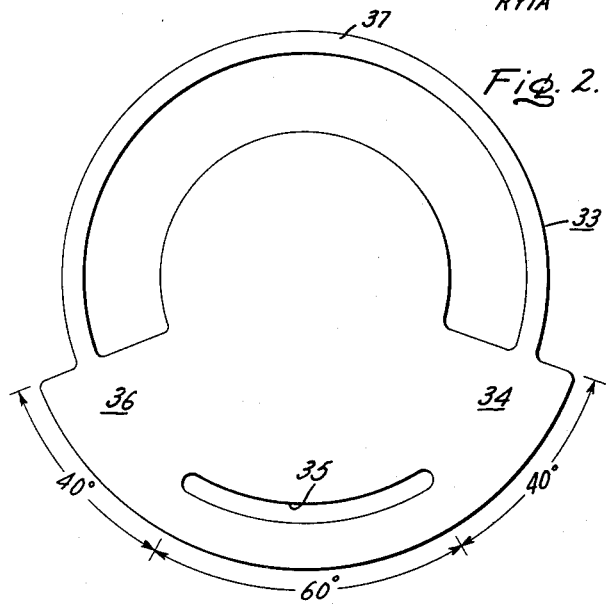
Figure 3:
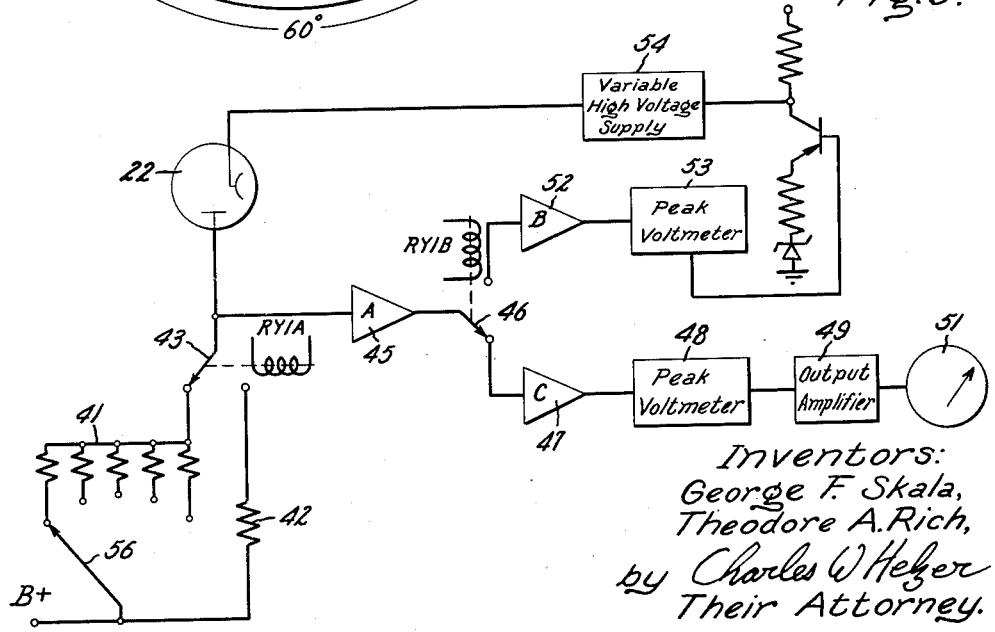

Other objects, features and many of the attendant advantages of this invention, will be appreciated more readily as the same becomes better understood by reference to the following detailed description, when considered in connection with the accompanying drawings, wherein like parts in each of the several figures are identified by the same reference character, and wherein: FIGURE 1 is a schematic diagram of a new and improved single phototube, stabilized condensation nuclei meter constructed in accordance with the present invention; FIGURE 2 is a plan view of a light shutter employed in the condensation nuclei meter of FIGURE 1; and FIGURE 3 is a functional block diagram of a comparison circuit employed in the condensation nuclei meter of FIGURE 1.

In the embodiment of the invention illustrated in FIGURE 1, a condensing means comprised by an expansion chamber 11 is interconnected to a sample inlet source, and humidifier (not shown) through an inlet regulating valve 12, and is interconnected to a suitable vacuum pump through an outlet regulating valve 13. The inlet and outlet valves 12 and 13 are mechanically interconnected to a common drive motor 14, and are appropriately shaped so that they are actuated in synchronism. In operation, the regulating valves 12 and 13 serve to sequentially introduce a humidified sample of an atmosphere which is to be monitored at 100% relative humidity into the expansion chamber 11 through inlet valve 12, the inlet valve 12 is then closed, and the outlet valve 13 is opened to suddenly expand the atmosphere within expansion chamber 11. As the expansion progresses, the sample within expansion chamber which previously was at 100% relative humidity will become supersaturated, and droplets will be formed about the condensation nuclei present in the sample as condensation centers. Once the required super-saturation is achieved, the start of the growth process of the droplets around the microscopic condensation particles as centers is virtually instantaneous and the droplet will grow to its final size in a few milliseconds requiring on the order of less than one millisecond. The mechanism involved in the condensation of vapor about the condensation nuclei centers is dependent upon both the instantaneous relative humidity, and on the size of the nuclei. The mechanism can be explained in the following manner: As the expansion occurs, the humidity of the gas or atmosphere being sampled tends to rise sufficiently above 100% relative humidity, that is, it becomes super-saturated by the sudden expansion of the gas within the chamber. As a result, an unstable condition occurs, and condensation commences the deposition of liquid around the nuclei particles as centers in order to achieve an equilibrium condition. The deposition of the liquid on the nuclei as centers will continue until the humidity is lowered to a new equilibrium condition representing substantially 100% relative humidity for the new temperature. This phenomenon, as well as the detailed construction of suitable mechanisms for achieving the sudden expansion, is described in previously published patents and literature, and hence will not be discussed in further detail. For example, see United States Patent No. 3,007,367 entitled "Condensation Nuclei Detector," Theodore A. Rich, inventor, issued November 7, 1961, and assigned to the General Electric Company.

A light source comprised by a lamp 15 is positioned to direct light through a window formed by condenser lenses 16 supported within a housing 17 that defines the expansion chamber 11. A central partition 18 is formed within the housing 17 which supports a divider lens assembly 19 upon which light entering the condenser lens 16 is focused. The dividing partition 18 and divider lens assembly 19 form one end of the expansion chamber 11 into which the sample being monitored is introduced, and the remaining end of the expansion chamber 11 is formed by second window 21 through which light is transmitted to a light sensitive electro optical means comprised by a phototube 22. Since all of the elements listed above including the condenser lens assembly 16, the divider lens 19, and window 21, are conventional in construction and function, they will not be described in further detail.

The optical system comprised as described above, projects a beam of light through the expansion chamber in such a manner that the light falls on the light sensitive electro optical device 22 only if a cloud of droplets is present in the expansion chamber 11. This result is achieved because of the following features: The condenser lens assembly 16 is positioned at one end of the housing 17 adjacent to the light source 15 in a manner to focus a beam of light on the divider lens assembly 19. The divider lens assembly 19 projects a beam of light into the expansion chamber 11, and since the light from condenser lens 16 is focused at the divider lens 19, the divider lens acts effectively as a source of light positioned at the point 19. As a consequence, a cone of light will be produced within expansion chamber 11 which will subtend an angle a–a within the expansion chamber.

To insure that only light scattered by droplets formed within the expansion chamber 11 impinges upon the phototube 22, an opaque light barrier 25 of circular configuration is positioned in front of the window 21 by means of a plurality of mounting studs 26, and serves to block the direct light path from the divider lens 19 to the light sensitive phototube 22. In this manner it is assured that only light scattered by droplets formed within the expansion chamber 11 will be allowed to impinge upon the light sensitive phototube 22.

In order to avoid an inaccurate reading because of the possibility of direct projected light striking the edge of the opaque disc 25, and being diffracted into the window 21, a cone of darkness defined by the dotted lines marked b—b, is formed within the expansion chamber 11. This cone of darkness b—b lies within the cone of light a—a, and is of sufficient size so that the edge of the opaque disc 25 is not illuminated. To accomplish this effect, an opaque circular disc 27 is mounted on the condenser lens assembly 16 intermediate the divider lens 19 and the condenser lens assembly 16. By this means, the cone of darkness b—b is produced within the cone of light a—a so that only an annularly shaped cone of light rays is effective for illuminating the cloud of droplets within expansion chamber 11. This annular volume of light ray is illustrated in FIGURE 1 of the drawings as lying between the two dotted lines a–b, and insures that a substantial portion of all the light projected into the expansion chamber 11 will be intercepted and scattered by the cloud water droplets. In this manner, the sensitivity of the instrument is greatly increased.

While the above features greatly improve the sensitivity of a condensation nuclei meter, they do not allow for changes in the sensitivity of the meter, due to long term changes in the characteristics of the light sensitive phototube 22, or changes in the optical properties of the expansion chamber. To correct for changes in these properties, the present invention was devised. For this reason, an aperture is formed in the center of the opaque disc 25, and a light transmitting tube 29 is inserted thru light barrier 25 to reduce stray light from the illuminated portions of the divider lens 19. The light transmitting tube 29 is aligned with a similar opening 31 formed in the opaque disc 27 mounted on the condenser lens assembly 16 so that a direct light path may be established between the light source 15, through the aperture 31, and the light tube 29 to the light sensitive phototube 22. Because this direct light ray path may be of sufficient intensity to saturate the light sensitive phototube 22, it is desirable that an attenuating disc 32 be mounted in the central portion of the window 21 so as to attenuate somewhat by a predetermined amount, the direct light rays transmitted along the central light path defined by the aperture 31 and light tube 29.

In addition to the above modifications, a light modifying means is provided for switching the light rays between the direct light path and the light scattering path. This light modifying means is comprised by a shutter 33 disposed intermediate the light source 15 and the condenser lens assembly 16 so as to interrupt the light being transmitted from the light source to the expansion chamber 11. This light shutter is driven through a suitable gearing arrangement 34 by the drive motor 14 so that the light shutter 33 is driven in synchronism with the expansion regulating valves 12 and 13. A plan view of the light shutter 33 is shown in FIGURE 2 of the drawings wherein it can be seen that the shutter is comprised by a portion 34 which cuts off all light to the expansion chamber from light source 15, a portion 35 which passes only the light through the central path formed by the aperture 31 and light tube 29 to the phototube 22, a portion 36 which again cuts off all light to the expansion chamber 11, and a portion 37 which passes only the light in the annular area surrounding the central path formed by the aperture 31 and light tube 29. As stated previously, the light shutter 33 is rotated in synchronism with the regulating valves 12 and 13 so that alternately as the portion 34 is rotated between the light source 15 and condenser lens 16, all light to the expansion chamber will be cut off. As the portion 35 is rotated into position, a reference light beam will be established through the central light path to phototube 22. Subsequently, the portion 36 is rotated into position again cutting off all light to the expansion chamber, and then the portion 37 is rotated into position. With the portion 37 in position, all light through the central reference light beam path is cut off, and only light scattered by droplets formed in the expansion chamber 11 is allowed to pass through the window 21 and impinge upon the phototube 22. Accordingly, it can be appreciated that the actuation of the regulating valves 12 and 13 must be sychronized with the rotation of the light shutter 33 in a manner so that no droplets are present in the expansion chamber 11 as the reference light beam is being directed through the open portion 35 of the light shutter 33 and along the central light path. Subsequently, a 100% humidified sample of an atmosphere to be measured will be introduced through inlet regulating valve 12 into expansion chamber 11 during the period of the time that portion 36 of light shutter 33 is located intermediate the light source 15 and the condenser lens assembly 16. In addition to the above functions, it might also be noted that the portions 34 and 36 of the light shutter 33 serve as a zero level light reference. During the interval when portion 37 of the light shutter is in position, the regulating valve 13 must open so as to rapidly expand the humidified sample in the previously described manner and condense droplets about the condensation nuclei particles entrained in the samples. The period of time required for this to occur will, of course, be determined by the degree of super-saturation of the humidified samples as well as the size of the particles, and their concentration. In one particular embodiment of the invention, the light shutter and valve operation was designed to allow a growth time of about 26 milliseconds during the expansion period. Upon the portion 37 of the light shutter being rotated into position, and the cloud of droplets having been formed, light scattering will take place within the expansion chamber 11 in accordance with the droplet formation. The light thus scattered will impinge upon phototube 22, and will produce an output electric signal from the phototube 22 which is representative of the number of particles thus detected. Subsequently, the outlet regulating valve 13 is actuated to flush out the expansion chamber 11 for the next cycle of operations. In one particular embodiment of the invention, the sampling rate was five times a second, and an essentially continuous measurement of nuclei concentration was obtained. The response time for an instrument thus designed is about one second, due in part to flow delays, particularly in the humidifier used to humidify the sample to be expanded in expansion chamber 11. If desired the campling rate can be at least 20 per second, but there is no gain if conventional recorders of about 1 second response are used. It has been determined that the light signal produced by the photomultiplier tube 22 is proportional to the product of the droplet concentration and the scattering area of each droplet. At any one instant of time, all droplets, once they are large enough to scatter light, will be virtually the same size and therefore given a set growth period, the output light scattered to the photomultiplier tube 22 will be primarily a function of the concentration of condensation nuclei particles entrained in the sample and independent of the size of the original nucleus. The scattered light can be made a linear relation of number if the expansion is short, i.e., in comparison to the time required for complete condensation.

The manner in which the reference potential developed by the phototube 22 during the direct reference light path period is used to improve the stabilization of the meter, is best illustrated in connection with FIGURE 3 of the drawing. As shown in FIGURE 3, the anode of the photomultiplier tube 22 is connected to a source of positive plate potential through a set of range resistors 41, or through a reference resistor 42, either of which is selectively connected in circuit relationship with the anode of the phototube 22 by a relay actuated switch contact 43. The switch 43 is actuated by a relay winding marked RY1–A that in turn is actuated from a cam operated switch 44 (shown in FIGURE 1) driven by the motor 14. The potential appearing across the range resistors 41, or reference resistor 42, is supplied through a common amplifier 45 to a second relay actuated switch arm 46. One fixed contact of the switch arm 46 is connected through a second amplifier 47, a peak voltmeter 48, and through an output amplifier 49 to an indicator 51. The remaining fixed contact of the switch arm 46 is connected through a third amplifier 52 and peak voltmeter 53 to a variable high voltage supply 54 that in turn is connected to the cathode of the phototube 22. Switch contact arm 46 is controlled by relay winding RY1–B that in turn is actuated from a cam operated switch 55, similarly driven by motor 14 in synchronization with the regulating valves 12 and 13, and light shutter 33.

In operation, the relay actuated switches 43 and 46, are synchronized with the regulating valves 12 and 13, and light shutter 33 so as to separate the analytical and reference signals in the circuit shown in FIGURE 3. One set of fixed contacts of the switch 43 introduces alternately one of the range resistors 41 as determined by a selector switch 56 connected in circuit relationship with the phototube 22 during the measurement or analytical period. The particular value range resistor selected by selector switch 56 is determined by the nuclei concentration in order to obtain a full scale indication of the count, and hence provides a means for adjusting the sensitivity of the instrument in accordance with the concentration of condensation nuclei particles present in the atmosphere being sampled. The signal appearing across the range resistor 41 is amplified by amplifiers 45 and 47, and then supplied to the peak voltmeter 48, output amplifier 49 and output indicator 51 to provide an output indication of the concentration of condensation nuclei present in the sample being monitored. During the alternate half cycle while the reference channel is connected in circuit relationship by relay switch 46, the potential appearing across the reference resistor 42 is supplied through amplifiers 45 and 52 to peak voltmeter 53, and then to the variable high voltage supply where it is compared to a reference voltage across a zener diode. If the reference voltage developed across resistor 42 is too low the output of the variable high voltage supply 54 is increased to raise the gain of the photomultiplier tube 22 and in this manner the output of the reference channel is maintained at a constant level in spite of long term changes in the intensity of the light source 15, variations in the lens condition, optical characteristics of expansion chamber 11, or changes in the photomultiplier tube characteristics. Because the gain of the analytical channel is determined primarily by the above-mentioned elements, it too will remain essentially constant with the exception of any changes occurring in the gain between the amplifiers 47 and 52. To minimize this effect, these amplifiers, and the peak voltmeters 48 and 53 are identical in construction, and employ negative feedback to maintain maximum stability. In this manner, variations in the reference and analytical channels are minimized.

From the foregoing description, it can be appreciated that the invention provides a single phototube stabilized condensation nuclei meter wherein variations in the sensitivity of the instrument due to long term variations in the light source intensity, optical properties of the expansion chamber, variation in phototube characteristics, are minimized thereby making available a comparatively stable, sensitive instrument which is relatively inexpensive to manufacture.

Having described one embodiment of a new and improved single phototube, stabilized condensation nuclei meter constructed in accordance with the invention, it is believed obvious that other modifications and variations of the present invention are possible in light of the above teachings. It is, therefore, to be understood that changes may be made in the particular embodiment of the invention described which are within the full intended scope of the invention as defined by the appended claims.

What we claim as new and desire to secure by Letters Patent of the United States is:

1. A new and improved condensation nuclei meter including in combination condensing means for periodically condensing liquid droplets about the condensation nuclei particles to be measured as centers, a light source for directing light through said condensing means, light sensitive means responsive to light scattered by the liquid droplets formed in said condensing means for developing an output electric signal representative of the condensation nuclei count, means for transmitting a reference light beam from the light source through said condensing means directly to said light sensitive means so as to avoid any light scattering effect, and light modifying means positioned intermediate the light source and the condensing means for modifying the light from the source to cause it selectively to travel to the light sensitive means by either said light scattering path or directly.

2. The combination set forth in claim 1 further characterized by comparison circuit means operatively coupled to the light sensitive means for comparing the output electric signal developed by the light sensitive means in response to the direct path light rays to a reference potential thereby to develop an error signal for use in maintaining the sensitivity of the meter at a preselected level.

3. The combination set forth in claim 1 further characterized by light attenuation means disposed in the direct ray light path intermediate the light source and the light sensitive means for attenuating the light rays directly impinging on said light sensitive means a predetermined amount.

4. The combination set forth in claim 1 further characterized by means for synchronizing the operation of the condensing means and the light modifying means whereby light from the light source travels through the condensing means to the light sensitive means by way of the light scattering path during periods when droplets are formed in the condensing means, and by way of the direct path during intermediate periods.

5. The combination set forth in claim 1 further characterized by means for synchronizing the operation of the condensing means and the light modifying means whereby light from the light source travels through the condensing means to the light sensitive means by way of the light scattering path during periods when droplets are formed in the condensing means, and by way of the direct path during intermediate periods, light attenuation means disposed in the direct ray light path intermediate the light source and the light sensitive means for attenuating the light rays directly impinging on said light sensitive means a predetermined amount, comprising circuit means operatively coupled to the light sensitive means for comparing the output electric signal developed by the light sensitive means in response to the direct path light rays and to a reference potential thereby to develop an error signal for use in maintaining the sensitivity of the meter at a preselected level.

6. A new and improved condensation nuclei meter including in combination, an expansion chamber for periodically expanding a humidified sample of atmosphere to condense droplets about condensation nuclei particles entrained in the sample and expelling the expanded sample, first and second light transparent windows formed in said expansion chamber, light sensitive electro-optical means positioned adjacent the second window for developing an electric output signal in response to light emanating from the first window and impinging on the light sensitive electro-optical means, a light source positioned adjacent said first window for irradiating the interior of the expansion chamber and an opaque disk having a central opening therein positoned intermediate the first and second windows for preventing most of the direct radiation from said light source from impinging on said light sensitive electro-optical means, and allowing only diffuse light scattered by the droplets formed in said expansion chamber to be transmitted through said second window to the light sensitive electro-optical means, and a light shutter positioned intermediate the light source and the first window for successively cutting off all light to the expansion chamber, passing the light from only a central opening in the window to the expansion chamber, again cutting off all light to the chamber, and then passing only the light through an annular area surrounding the central portion of the window to the expansion chamber, the central opening formed in the opaque disk serving to allow light rays from only the central portion of the window to be transmitted directly to the light sensitive electro-optical means during the second period of operation of the light shutter.

7. A new and improved condensation nuclei meter comprised in part by an expansion chamber for periodically expanding a humidified sample of atmosphere to condense droplets about condensation nuclei particles entrained in the sample and expelling the expanded sample, first and second light transparent windows formed in said expansion chamber, light sensitive electro-optical means positioned adjacent the second window for developing an electric output signal in response to light emanating from the first window and impinging on the light sensitive electro-optical means, a light source positioned adjacent said first window for irradiating the interior of the expansion chamber and an opaque disk positioned intermediate the first and second windows for preventing direct radiation from said light source from impinging on said light sensitive electro-optical means and allowing only diffuse light scattered by the droplets formed in said expansion chamber to be transmitted through said second window to the light sensitive electro-optical means, the improvement comprising a light shutter positioned intermediate the light source and the first window for successively cutting off all light to the expansion chamber, passing only the light through a central path through the expansion chamber, again cutting off all light to the chamber, and then passing only the light through an annular area surrounding the central path, a central opening formed in the opaque disk for allowing light rays traveling along the central path only to be transmitted directly to the light sensitive electro-optical means during one portion of the movement of the light shuttter, a light attenuating disk disposed in said central path only intermediate the light sensitive electro-optical means and light shutter, and synchronizing means for synchronizing the periodic expansion in said expansion chamber with the operation of said light shutter.

8. A new and improved condensation nuclei meter including in combination an expansion chamber for periodically expanding a humidified sample of atmosphere to condense droplets about condensation nuclei particles entrained in the sample and expelling the expanded sample, first and second light transparent windows formed in said expansion chamber, light sensitive electro-optical means positioned adjacent the second window for developing an electric output signal in response to light emanating from the first window and impinging on the light sensitive electro-optical means, a light source positioned adjacent said first window for irradiating the interior of the expansion chamber and an opaque disk having a central opening therein positioned intermediate the first and second windows for preventing most of the direct radiation from said light source from impinging on said light sensitive electro-optical means, and allowing only diffuse light scattered by the droplets formed in said expansion chamber to be transmitted through said second window to the light sensitive electro-optical means, a light shutter positioned intermediate the light source and the first window for successively cutting off all light to the expansion chamber, passing only the light through a central opening in the window to the expansion chamber, again cutting off all light to the chamber, and then passing only the light through an annular area surrounding the central portion of the window to the expansion chamber, the central opening formed in the opaque disk serving to allow light rays from only the central portion of the window to be transmitted directly to the light sensitive electro-optical means during the second period of operation of the light shutter, and comparison circuit means operatively coupled to said light sensitive electro-optical means for comparing the output electric signal developed by the light sensitive electro-optical means in response to the direct path light rays and to a reference potential thereby to develop an error signal for use in maintaining the sensitivity of the meter at a preselected level.

9. A new and improved condensation nuclei meter including in combination an expansion chamber for periodically expanding a humidified sample of atmosphere to condense droplets about condensation nuclei particles entrained in the sample and expelling the expanded sample, first and second light transparent windows formed in said expansion chamber, light sensitive electro-optical means positioned adjacent the second window for developing an electric output signal in response to light emanating from the first window and impinging on the light sensitive electro-optical means, a light source positioned adjacent said first window for irradiating the interior of the expansion chamber and an opaque disk having a central opening therein positioned intermediate the first and second windows for preventing most of the direct radiation from said light source from impinging on said light sensitive electro-optical means, and allowing only diffuse light scattered by the droplets formed in said expansion chamber to be transmitted through said second window to the light sensitive electro-optical means, a light shutter positioned intermediate the light source and the first window for successively cutting off all light to the expansion chamber, passing only the light through a central opening in the window to the expansion chamber, again cutting off all light to the chamber, and then passing only the light through an annular area surrounding the central portion of the window to the expansion chamber, the central opening formed in the opaque disk serving to allow light rays from only the central portion of the window to be transmitted directly to the light sensitive electro-optical means during the second period of operation of the light shutter, comparison circuit means operatively coupled to said light sensitive electro-optical means for comparing the output electric signal developed by the light sensitive electro-optical means in response to the direct path light rays and to a reference potential thereby to develop an error signal for use in maintaining the sensitivity of the meter at a preselected level, a light attenuating disk disposed in said central portion of the window intermediate the light source and the light sensitive electro-optical means for attenuating the direct light rays impinging on said light sensitive electro-optical means a predetermined amount, and synchronizing means for synchronizing the periodic expansion in said expansion chamber with the operation of the light shutter and the comparison circuit means.

References Cited by the Examiner

UNITED STATES PATENTS

| | | | |
|---|---|---|---|
| 3,010,308 | 11/61 | Skala | 88—14 |
| 3,078,756 | 2/63 | Barton et al. | 88—14 |
| 3,127,464 | 3/64 | Gustavson | 88—14 |

JEWELL H. PEDERSEN, *Primary Examiner.*